United States Patent [19]

Hewing et al.

[11] 4,338,994
[45] Jul. 13, 1982

[54] MODULAR PANEL HEATER HAVING IMPROVED HOLDER DEVICES

[76] Inventors: Bernd Hewing, Hellstiege 1o;
Franz-Josef Hagemann,
Eichendorffweg 8, both of 4434
Ochtrup, Fed. Rep. of Germany

[21] Appl. No.: 115,663

[22] Filed: Jan. 28, 1980

[51] Int. Cl.³ .................................................. F24D 19/02
[52] U.S. Cl. ............................................. 165/49; 165/53;
165/67; 165/168; 237/69; 248/74 A
[58] Field of Search ............... 165/49, 53, 67, 168,
165/171; 237/69; 248/62, 73, 74 A, 207;
403/397, 400

[56] References Cited

U.S. PATENT DOCUMENTS

| 2,480,427 | 8/1949 | Stanton | 165/67 |
| 4,109,859 | 8/1978 | Dürst | 237/69 |

FOREIGN PATENT DOCUMENTS

| 2456836 | 6/1976 | Fed. Rep. of Germany . | |
| 2515708 | 10/1976 | Fed. Rep. of Germany | 237/69 |
| 2553967 | 6/1977 | Fed. Rep. of Germany | 165/53 |
| 2614694 | 10/1977 | Fed. Rep. of Germany | 237/69 |
| 2644711 | 12/1977 | Fed. Rep. of Germany . | |
| 2650160 | 5/1978 | Fed. Rep. of Germany | 165/49 |
| 2749002 | 5/1979 | Fed. Rep. of Germany | 165/49 |
| 2809961 | 9/1979 | Fed. Rep. of Germany | 165/171 |
| 1333202 | 6/1963 | France | 403/400 |
| 2302486 | 9/1976 | France | 165/53 |
| 569235 | 11/1975 | Switzerland . | |
| 571689 | 1/1976 | Switzerland | 165/49 |

*Primary Examiner*—Albert W. Davis
*Assistant Examiner*—Margaret A. Focarino
*Attorney, Agent, or Firm*—Cushman, Darby & Cushman

[57] ABSTRACT

A shaped mounting module for a liquid-type panel heating system is provided on which a heater pipe is mounted by means of discrete holder devices. In one embodiment, the panel is provided with a grid of flanges for supporting the heater pipe above the surface of the panel. In another embodiment, the panel is provided with a plurality of protrusions having their upper surfaces approximately level with the top of the mounted heater pipe to form a plurality of intersecting channels through which the heater pipe passes. Each of the holder devices has a plurality of opposite paired axially symmetrical openings formed by a plurality of axial symmetrical fingers having recesses therebetween. The heater pipe is either pressed into or passed through a selected pair of openings during assembly of the heating system. The holder devices are affixed to the panel either during the panel forming process or by adhesive bonding of the base into circular depressions on the panel during assembly of the heating system.

24 Claims, 8 Drawing Figures

MODULAR PANEL HEATER HAVING IMPROVED HOLDER DEVICES

BACKGROUND OF THE PRESENT INVENTION

The present invention relates to a shaped mounting module, prefabricated from thermally insulating material such as polystyrene foam or the like, for liquid-type panel heater systems, on which module the heater pipe may be assembled and mounted by means of holder devices having upwardly opening recesses.

A module of the above-indicated type is known from the laid-open German patent application No. 2,456,836, wherein comb-like or flange-like holder devices are employed which have in their upper sides recesses equally spaced from the edges of the module. Spacings and arrangement of these recesses are chosen so that upon assembly of the modules, the recesses of one module are aligned with the recesses of the adjacent module.

Modules according to this prior art have been installed with satisfactory results in a great number of applications. However, the construction and installation disadvantages make improvements desirable.

One disadvantage in the prior art is that during installation and cutting to size, the amount of work, and particularly the time required for the work, is excessive. In adjusting registry of the panels, the panels must be cut apart or divided by saw. Owing to the different materials of which panel and flange are constructed, this operation results in difficulty and delay in operation.

Another disadvantage in the prior art is that the manufacture of the modules is not sufficiently easy and economical. In particular, the sometimes problematic foam-anchoring of long flanges should be avoided.

Another disadvantage in the prior art is that the stackability of the panels during storage and transport is not completely satisfactory.

Another disadvantage in the prior art is that the attachment of the curved sections of the pipes is not completely satisfactory.

Furthermore, it is known to produce floor heating systems from plastic tubes wherein each tube is mounted in brackets or holders provided with grooves (compare, e.g., laid-open German patent application No. 2,515,708). The disadvantages of such prior art floor heating systems are that the brackets are pressed directly into the concrete material of the floor, and the grooves are arranged only in one direction.

SUMMARY OF THE INVENTION

The disadvantages of the prior art are overcome and additional objectives are achieved by a module for liquid-type heater systems wherein the holder devices comprise a base and an upright rim provided with paired oppositely disposed recesses.

These holder devices may be distributed to be disposed separately or locally across the surface of the modules. Thus, the use of flanges that have recesses and extend across the full width and length of a module, as according to the prior art, can be dispensed with. Instead separate holder devices are used. Preferably, the distribution across the panel is made with regular, raster-type spacings, as will be explained in greater detail below.

When panels provided with prior art flanges must each be broken or cut, problems arise because of the different material properties of the panels and flanges. According to the present invention, the holder devices are separately distributed across the panel. Therefore, a cut may pass between the holder devices without encountering these holder devices per se. Besides, these devices may be readily removed from the panel when this should become necessary.

The stackability of the panels is improved by the fact that these panels may be laid one above the other without any attached holder or retainer device to interfere. The holder device can be easily inserted by pressing them into the panel at a later time. The conventional marginal webs or flanges which necessarily had to be secured by foaming during manufacture protruded above the panel surface and were liable to damage the overlying panels.

Postion and closeness of the installed heater pipes may be subject to extreme variation, and the distribution of the holder device according to the present invention offers numerous possibilities for providing sufficient heating capacity to the plumber installing a heater system according to the present invention. Furthermore, in the case of heater pipes installed with curvature, a holder device may be located at the apex of the curvature. That holder device takes up the bending force and provides for maintaining an exact position of the arc of curvature.

Another advantage of the present invention is the configuration of the holder devices which are inexpensively manufactured of plastic molded parts. The configuration ensures reliable mounting even under substantial stress by heat, pressure and dislocating forces. Preferably, the recesses have clamping portions in which the heater pipes may be secured. Most advantageously, the clamping feature is realized by means of a holder or retainer device which comprises a base and four fingers standing up from the base, the fingers being distributed in axially symmetrical fashion and having a curved or bent, resilient end portion. Furthermore, the fingers each extend toward the center of the base, with one recess each being defined between a pair of fingers.

When manufacturing the modules, initially the panel proper is formed, preferably without the holder devices. Holder devices having a base plate or a base rim may be provided. The surface of the panel is provided with corresponding depressions for the insertion of the holder devices. These depressions serve to receive the holder devices which are secured thereto by adhesive bonding, frictional engagement, bolting, or welding. Of course, various types of attachment are feasible without departing from the scope of the invention.

Other objects, features and advantages of the present invention will become more fully apparent from the following detailed description of the various embodiments the appended claims, and the accompanying drawings.

BRIEF DESCRIPTION OF THE DRAWINGS

In the drawings, where like numbers indicate like parts.

DETAILED DESCRIPTION OF THE PREFERRED EMBODIMENTS

Figure 1A:
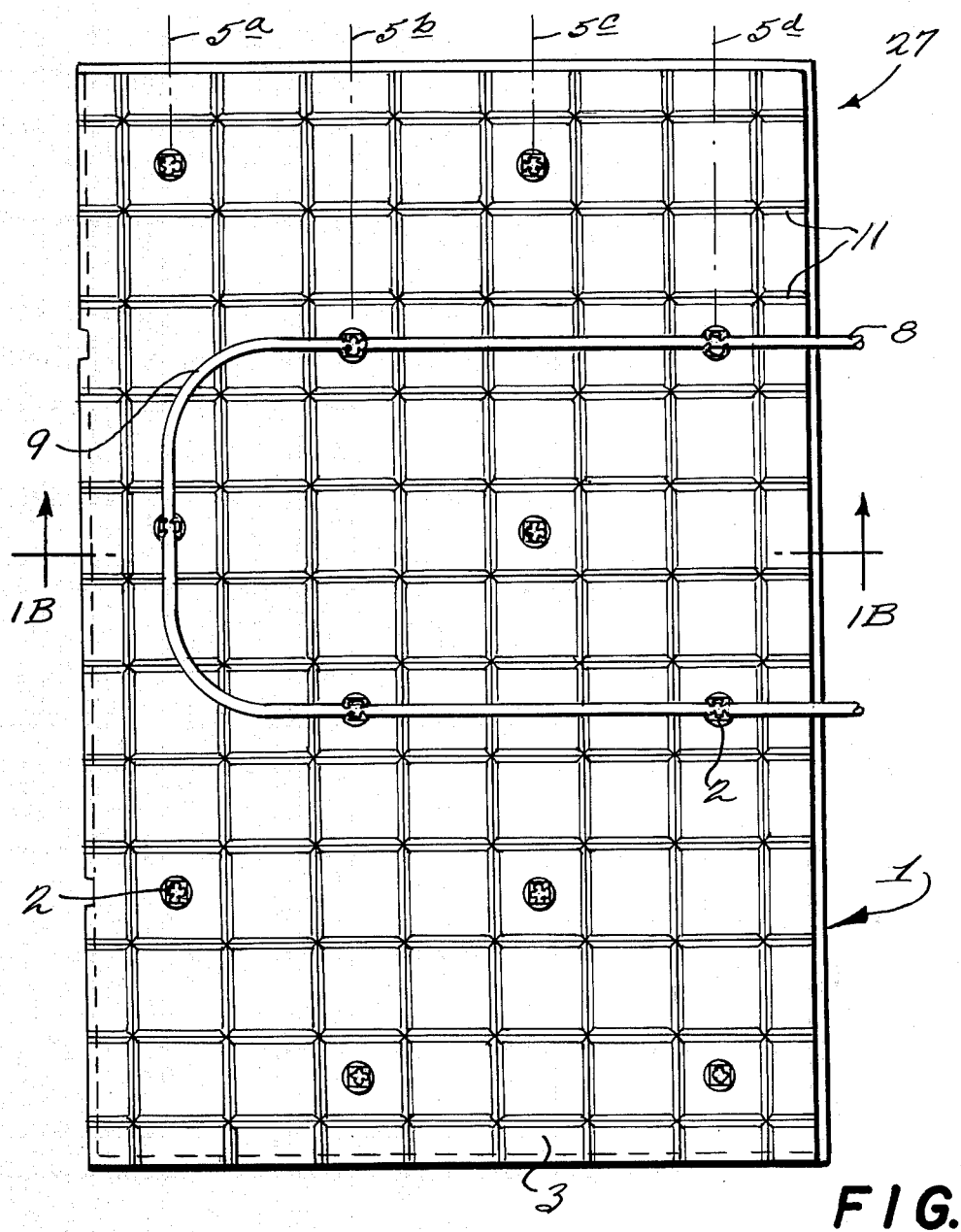
FIG. 1A is a view showing the top of a first preferred embodiment of a module according to the present invention.
Figure 1B:
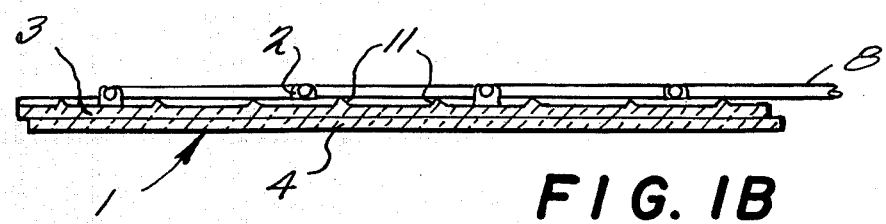
FIG. 1B is a sectional view of the module of FIG. 1A along lines B—B.

FIGS. 1A and 1B illustrate a first preferred embodiment of a module 27, according to the present invention, formed of a thermally insulating material. In the first preferred embodiment, the panel 1 measures approximately 100×66.7 cm. The module 27 comprises the panel 1 having holder (retainer) devices 2 secured thereto. As appears from the sectional view of FIG. 1B, the panel 1 has a double-layer construction of a polystyrene foam material comprising two different structures. The upper layer 3 comprises preferably a polystyrene heat insulation composition, whereas the lower layer 4 forms a thermally insulating and footfall sound attenuating zone. The parameters of polystyrene foams of this type are standarized by the German Standards Specifications (DIN) 4108 and 4109, respectively. In the present case, these characteristics do not form the subject matter of the invention as such.

Figure 3:
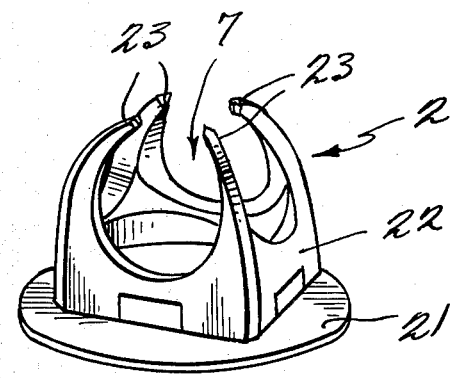
FIG. 3 is a perspective view of a first preferred embodiment of a holder device according to the present invention.

The upper layer 3 has embedded thereinto or anchored therein the holder devices 2 as distributed across the panel 1 as shown. These devices have the configuration as shown in FIG. 3 (described below). In the preferred embodiment the numerous holder devices 2 are separately and locally distributed across the surface (upper side) of the module 27. The holder devices 2 are arranged in tandem in groups of a plurality of such devices, on straight lines extending parallel with respect to the edges of the module 27, as indicated by phantom lines 5a, 5b, 5c and 5d.

A heater pipe 8, preferably formed of a heat resistant plastic material, is installed into the upwardly opening recesses of respective holder devices 2 and retained therein by clamping pressure. In this manner, curvatures, such as shown at 9, can easily be provided by engaging at least one holder device 2 at the apex of the curved section.

The distribution of the holder devices 2 on the module 27 is based upon a raster pattern which, in turn, is based upon a basic dimension which when extended by n times, results in an integral dimension of 1.00 m or 2.00 m. For example, the distance between respective holder devices 2 may be 0.67 meters which, when extended 3 times (n=3), results in the integral dimension of 2 meters.

Further, it appears from FIGS. 1A and 1B that supporting web (flanges) 11 for the heater pipe 8 are provided between said holder device 2 in such a way as to extend parallel to the sides of the module and to be spaced regularly across the surface of the module 27. The supporting web 11 holds the heater pipe 8 above the level of the remainder of the surface of the module 27, such that when a floor finish composition is poured over a module 27, the floor finish composition encloses the heater pipe 8 virtually completely. In this way, excellent thermal contact is brought about.

Furthermore, four short blocks (not shown) formed integrally of the material of the panel 1 may be provided in shamrock-fashion in proximity to each holder device 2. Positioned near a respective opening of the holder device 2, each block can provide support for pipe 8 in addition to the support provided by the web 11.

Installation of the modules 27 for liquid-type panel heater systems is done as follows. Respective modules 27 are placed in surface registry upon an existing concrete floor. The respective panels 1 are trimmed along webs 11 in order to match them to the existing dimensions of the building. In this operation, supporting webs 11, in addition to their supporting function, advantageous provide a visual aid for the placement of the panels 1. The "on site" work of the craftsman thereby is facilitated. It is also of advantage that a cut through the panel 1 may be made substantially through homogeneous material. If a cut is to be made straight through an area occupied by a holder device 2, the latter may be easily removed before making the cut.

Upon placement of the respective modules 27 onto the concrete floor, the heater pipe 8 is assembled to each of the modules 27 by pressing the heater pipe 8 into the holder devices 2, whereby the heater pipe 8 is retained by clamping jaws. Upon connecting and securing the heater pipe 8, a flowable floor finish composition may be poured onto each of the modules 27, whereby the composition is allowed to spread below the heater pipe 8. When the floor finish composition has set, the floor can be walked on.

Figure 2A:
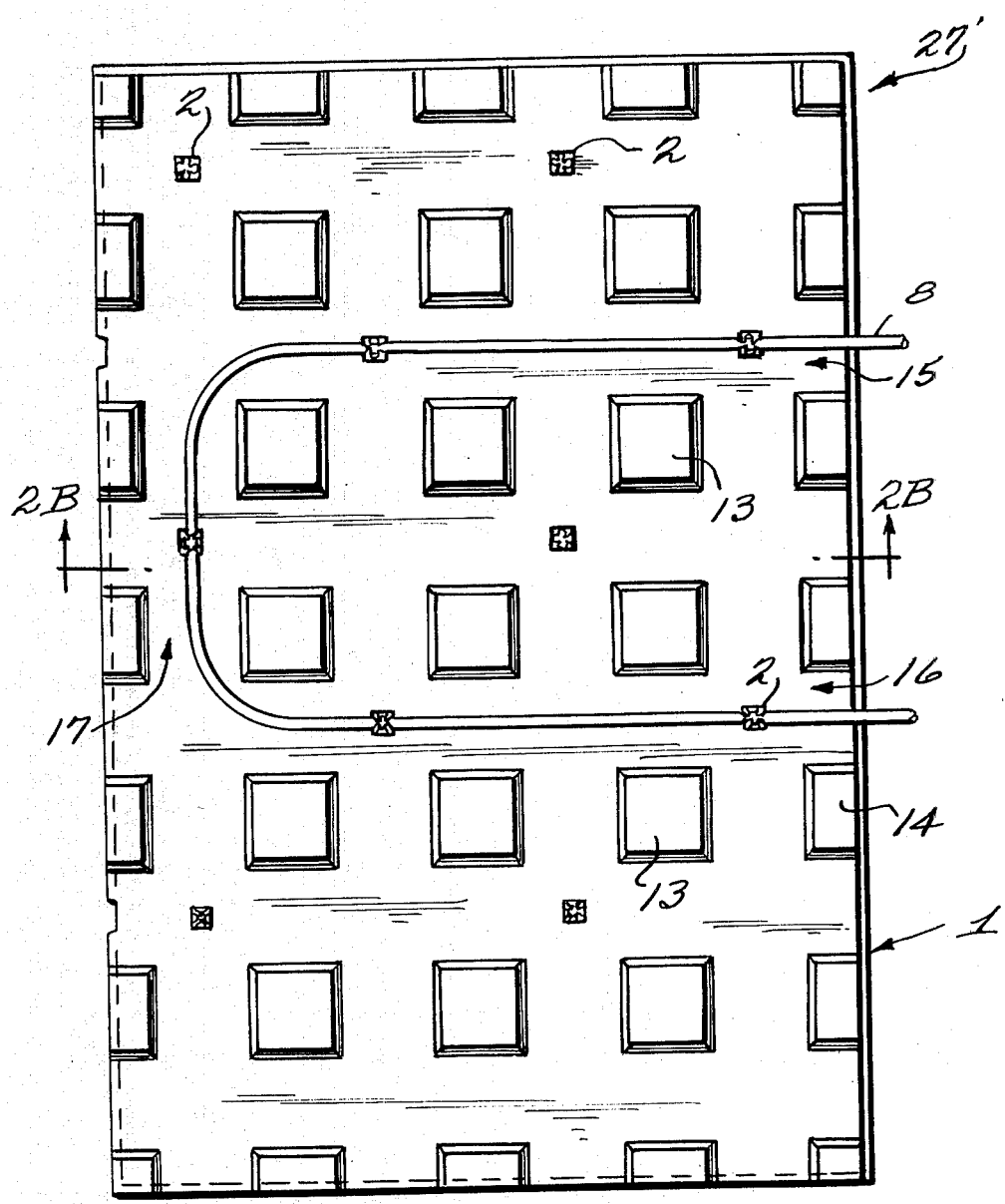
FIG. 2A is a view showing the top of a second preferred embodiment of a module according to the present invention.
Figure 2B:
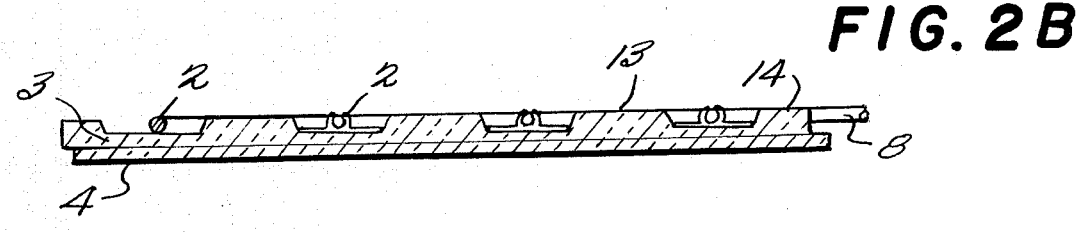
FIG. 2B is a sectional view of the module of FIG. 2A along lines B—B.

For use in so-called dry construction or in prefabricated house construction, it is necessary to use modules according to a second preferred embodiment of the invention. In such types of construction, upon a structural floor or ceiling slab of, for example, concrete there is applied another flooring layer which may comprise e.g. a thin fiberboard with a carpet coating. Pouring of a floor finish composition is not contemplated. In such case, the embodiment according to FIGS. 2A and 2B is used. The module 27, has a plurality of protrusions distributed across its surface (upper side), which protrusions are likewise in conformity with the raster pattern as provided for the module 27 according to FIG. 1. A great number of square protrusions 13 or of half-size protrusions 14 are located in a distribution pattern as shown in FIG. 2A to define therebetween unobstructed passageways such as, for example, passageways 15, 16 and 17, in which a heater pipe 8 may be assembled. In this case, the same holder devices 2 as in FIG. 1 are provided. Of course, supporting webs 11 are not used because the heater pipe 8 in this construction must be in contact with air to as high as possible a degree in order to provide for heat transmission to the floor above.

FIG. 2B illustrates the position of the heater pipe 8 and the height of the protrusions 13 and 14. It can be seen that the planar upper side of each of the protrusions 13 and 14 is approximately at the level of the apices of the assembled heater pipes 8.

Figure 4:
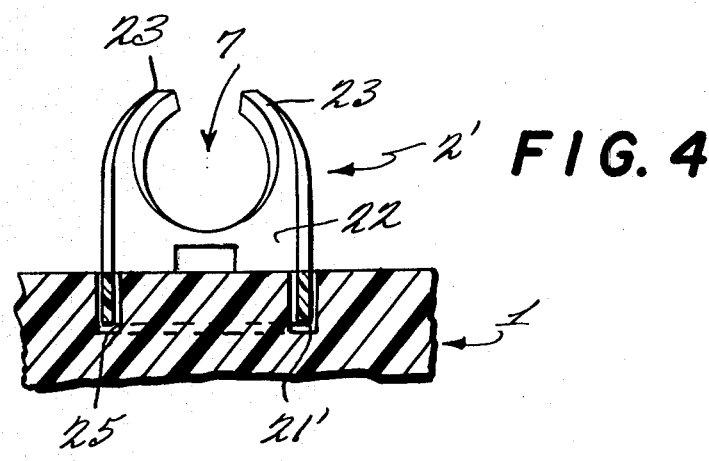
FIG. 4 is a fragmentary elevation of a second preferred embodiment of a holder device with a portion of the holder device and a panel shown in section (binding material omitted for clarity)
Figure 5:
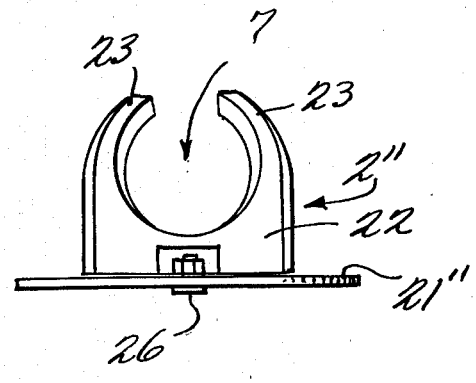
FIG. 5 is an elevation showing a side of a third preferred embodiment of a holder device according to the present invention.

FIGS. 3, 4 and 5 respectively illustrate first, second and third preferred embodiments of holder device, designated as 2, 2' and 2" respectively. The holder devices 2, 2' and 2" have in common with each other a base 21 (or 21', 21") including a rim 22 extending vertically upwards therefrom and being provided with at least one recess 7 for attachment of the heater pipe 8. According to FIG. 3, the holder device 2 comprises a base 21 having a wide foot portion of annular configuration, with four fingers 23 extending upwards therefrom. The fingers 23 are distributed around the base in axially symmetrical fashion and are provided with curved, resilient end portions pointing towards the center line of the base 21. The recesses 7 are each defined between fingers 23.

The heater pipe 8 is fitted into the recesses 7. In this structure, respective recesses 7 positioned opposite to each other are aligned with one another and define a pair of passageways crossing each other at a 90° angle for insertion of the heating pipe 8 to be assembled.

As can be seen from FIG. 4, the base 21' of the holder device 2' is embedded into the polystyrene foam material, preferably during foaming of the panel. However, it has been found to be expedient to initially refrain from fitting the holder devices 2' to the panel 1 before shipping and storage. The holder devices 2' are only subsequently fitted into preformed depressions 25 and adhesively bonded therein to the panel, as shown in FIG. 4. Accordingly, the holder devices 2' of FIG. 4 include a similar finger assembly (numeral 23) as in FIG. 3; however, the base 21' comprises a simple cylindrical rim which may be inserted into a corresponding circular depression 25. The depressions (cavities) 25 are already formed in the panels 1 as supplied. Upon installation of the panels 1, the holder devices 2' are fitted into respective depressions 25. This provides the further advantage that when assembling a heater pipe 8 which does not require the use of all the holder devices 2 that are capable of being inserted into the panel 1, unnecessary holder devices 2 need not be mounted to the panel at all, thereby further reducing cost. Finally, FIG. 5 shows a further holder device 2" comprising an insertable base 21" similar to that of FIG. 3. The rim 22 upstanding from the base 21", however, is secured by means of a center screw (or bolt) 26 such that the rim 22 may be rotated as required and thereafter fixed by tightening the screw 26.

Selection of the materials for the panel 1 and for the holder devices 2 depends generally on the local construction regulations. In addition to organic plastic material, inorganic materials, such as rock wool or pressed minerals, may be used. The holder devices 2 are preferably formed of plastic material. However, it is likewise possible to form the holder devices 2 of metal. Anchoring of the heater pipe 8 is effected by having each pipe 8 engaged into the recesses 7, with the latter being of such dimension that their side portions extend slightly across the maximum width of the pipe 8. The heater pipe 8 may be simply pressed or snapped into the recesses 7. However, this structure may be modified by placing the pipe 8 into the recesses 7 and thereafter securing the pipe 8 with the aid of auxiliary elements.

Figure 6:
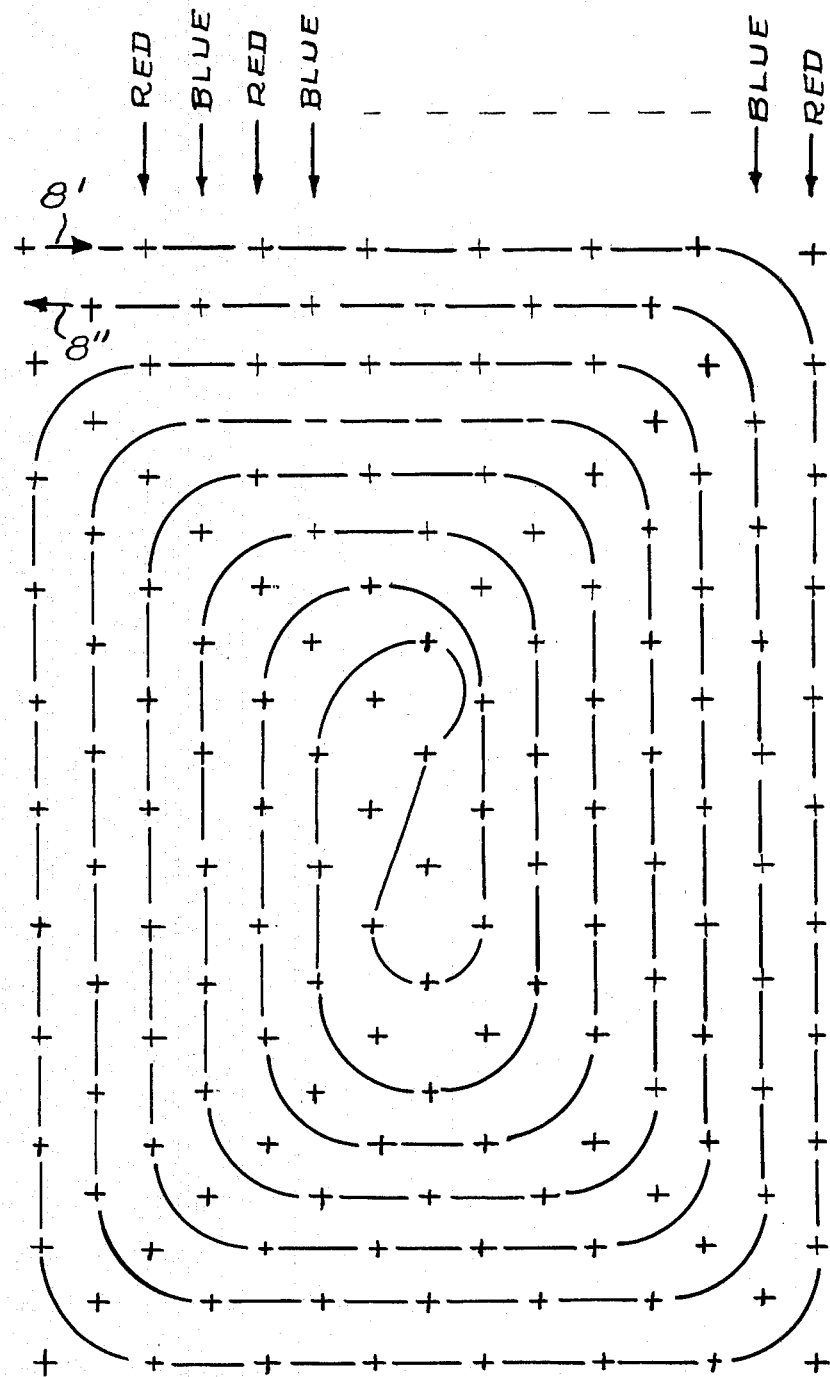
FIG. 6 is a diagram illustrating an exemplary installation method according to the present invention.

Another advantage is the fact that the holder devices 2, 2' or 2" may be formed of different colors. FIG. 6 shows schematically a floor covering of a room composed of a plurality of modules 27. In this pattern, separate rows of red and blue colored holder devices 2, which are indicated by crosses, are formed. The special arrangement in the staggered configuration of a regular grid, wherein four holder devices 2 of one color each surround a differently colored holder device 2 disposed precisely centrally between them, allows the use of red holder devices for only the installation of the inlet pipe 8' and blue holder devices for only the return pipe 8". This greatly facilitates the installation and assembling work.

While the present invention is described in connection with what is essentially conceived to be the most preferred practical embodiments, it is to be understood that the present invention is not limited to the disclosed embodiments. There may be other embodiments, modifications and equivalent arrangements included within the spirit and scope of the appended claims.

What is claimed is:

1. A modular panel heater, comprising:
   a panel fabricated from a polystyrene foam material that is thermally insulative and/or sound attenuating;
   a heating element attached to the panel; and
   a plurality of retaining members for attaching the heating element in a predetermined position with respect to the panel, the retaining members and panel being formed such that the retaining members are attachable and detachable at a plurality of locations, each retaining member including:
   a base portion; and
   a plurality of finger members extending from the base portion and distributed about said base portion in an axially symmetrical manner, the finger members curving toward one another in a direction away from the base portion so as to form pockets for press-fit retaining the heating element.

2. A modular panel heater according to claim 1, wherein the retaining members are positioned on the panel so as to define a plurality of equally-spaced rows separated by a first distance, each row having equally spaced retaining members separated by a second distance, alternate rows having respective first retaining members defining a first line and the rows between the alternate rows having respective first retaining members defining a second line parallel to the first line and offset therefrom by a predetermined distance.

3. A modular panel heater according to claim 1, wherein the panel comprises upper and lower layers.

4. A modular panel heater according to claim 2, wherein the panel comprises upper and lower layers.

5. A modular panel heater according to claim 1, wherein the panel is constructed as a single layer of material.

6. A modular panel heater according to claim 2, wherein the panel is constructed as a single layer of material.

7. The modular panel heater as in claim 2 wherein said first line and said second line are perpendicular to said rows.

8. The modular panel heater as in claim 7 wherein said offset equals one-half said second distance.

9. The modular panel heater as in claim 8 wherein said first distance equals one-half of said second distance.

10. The modular panel heater as in claim 9 wherein the retaining members forming said alternate rows are the same color, and the retaining members forming said between rows are a different color.

11. The modular panel as in claim 10 wherein said panel includes a plurality of depressions for receiving said retaining members, each of said retaining members being adhesively bonded to said panel at a respective depression.

12. The modular panel heater as in claim 1 wherein said panel comprises a plurality of flanges parallel to said equally-spaced rows and a plurality of flanges parallel to said first line and said second line for holding said cylindrical heating element above the surface of said panel.

13. The modular panel heater as in claim 1 wherein said panel comprises a plurality of protrusions, said protrusions having upper surfaces approximately level with the top of said heating element and being dispersed between said retaining members for defining a first and second group of channels, each of the channels of said first group being coextensive with the retaining elements defining a respective row of retaining elements and each of the channels of said second group being coextensive with the retaining elements defining a respective line parallel to said first line and said second line.

14. A modular panel heater according to claim 1, wherein the pockets are substantially circular.

15. The modular panel heater as in claim 13 wherein said panel comprises a plurality of protrusions, said protrusions having upper surfaces approximately level with the top of said heating element and at least one of said protrusions being between each pair of nearest neighboring retaining members for defining a plurality of intersecting channels between said retaining members.

16. A panel heater system module comprising:
a heating element;
a plurality of retaining members for retaining said heating element, each defining two perpendicular axes along which said heating element is capable of being held, each retaining member including a base portion and a plurality of finger members extending from the base portion in an axially symmetrical manner, the finger members curving toward one another in a direction away from the base portion so as to form pockets for press-fit retaining the heating element;
a panel fabricated from a polystyrene foam material that is thermally insulative and/or sound attenuating, each of said retaining members being detachably fixed to the panel and having four nearest neighboring retaining members, the nearest neighboring retaining members being equidistant from said each retaining member and each of the neighboring retaining members being equidistant from the two axes associated with said each retaining member.

17. A module according to claim 16, wherein the panel is fabricated from a single layer of material.

18. A module according to claim 16, wherein the panel comprises two layers of material.

19. A module according to claim 16, wherein the pockets are substantially circular.

20. The modular panel heater as in claim 16 wherein said four nearest neighboring retaining members are of a different color than said each retaining member.

21. The modular panel heater as in claim 20 wherein said panel includes a plurality of depressions for receiving said retaining members, each of said retaining members being adhesively bonded to said panel at a respective depression.

22. The modular panel heater as in claim 16 wherein said panel comprises a grid of intersecting flanges, said retaining members separated from one another by at least one of said flanges, for holding said cylindrical heating element above the surface of said panel.

23. A modular panel heater comprising:
a panel,
a cylindrical heating element; and
a plurality of members for retaining said heating element in a predetermined position with respect to said panel, said retaining members being fixed to said panel and defining a plurality of parallel equally-spaced rows separated by a first distance, each of said rows having equally-spaced retaining members separated by a second distance, the first retaining members of respective alternate rows defining a first line and the first retaining members of rows between said alternate rows defining a second line, said second line being parallel to said first line and offset from said first line by a predetermined distance wherein each of the retaining members comprises:
a base;
means for forming a plurality of pairs of axially symmetrical recesses extending from said base; and
a plurality of finger members extending upward from said base and distributed around said base in an axially symmetrical fashion for retaining said cylindrical heating element in a selected one of said pairs.

24. A panel heater system module comprising:
a heating element;
a plurality of members for retaining said heating element, each defining two perpendicular axes along which said heating element is capable of being held wherein each of said retaining members comprises:
a base;
means for forming a plurality of pairs of axially symmetrical recesses extending from said base; and
a plurality of finger members extending upward from said base and distributed around said base in an axially symmetrical fashion for retaining said cylindrical heating element in a selected one of said pairs; and
a panel, each of said retaining members being fixed to said panel and having four nearest neighboring retaining members, said nearest neighboring retaining members being equidistant from said each retaining member and each of said neighboring retaining members being equidistant from the two axes associated with said each retaining member.

* * * * *